United States Patent [19]

Seki et al.

[11] Patent Number: 5,494,742
[45] Date of Patent: Feb. 27, 1996

[54] MAGNETIC RECORDING MEDIUM HAVING IMPROVED RUNNING TIME AND CORROSION RESISTANCE

[75] Inventors: Hiroshi Seki, Katano; Kenji Kuwahara, Ikoma; Hideyuki Ueda, Takatsuki; Kiyosi Takahasi, Ibaraki; Masaru Odagiri, Kawanishi; Mikio Murai, Hirakata, all of Japan

[73] Assignee: Matsushita Electric Industrial Co., Ltd., Osaka, Japan

[21] Appl. No.: 229,428

[22] Filed: Apr. 12, 1994

[30] Foreign Application Priority Data

| Apr. 13, 1993 | [JP] | Japan | 5-085919 |
| Oct. 14, 1993 | [JP] | Japan | 5-256770 |
| Apr. 6, 1994 | [JP] | Japan | 6-068370 |

[51] Int. Cl.⁶ .............. B32B 5/16; B32B 9/00; B32B 9/04; G11B 5/66
[52] U.S. Cl. ............. 428/332; 428/336; 428/408; 428/447; 428/694 T; 428/694 TP; 428/694 TC; 428/694 TZ; 428/694 TF; 428/695; 428/704; 428/900
[58] Field of Search .............. 428/694 T, 694 TP, 428/694 TC, 694 TZ, 694 TF, 900, 695, 704, 408, 332, 336, 447

[56] References Cited

U.S. PATENT DOCUMENTS

| 4,165,232 | 8/1979 | Jaeckh et al. | 75/349 |
| 4,713,288 | 12/1987 | Kokaku et al. | 428/336 |
| 4,761,334 | 8/1988 | Sagoi et al. | 428/332 |
| 4,840,843 | 6/1989 | Sano | 428/336 |
| 4,840,844 | 6/1989 | Futamoto et al. | 428/336 |
| 4,880,687 | 11/1989 | Yokoyama | 428/141 |
| 4,900,622 | 2/1990 | Nakayama | 428/336 |
| 5,068,152 | 11/1991 | Maro et al. | 428/408 |
| 5,275,850 | 1/1994 | Kitoh | 427/577 |

FOREIGN PATENT DOCUMENTS

| 0179382 | 4/1986 | European Pat. Off. . |
| 0468778 | 1/1992 | European Pat. Off. . |
| 223926 | 7/1959 | Japan . |
| 35-29936 | 2/1960 | Japan . |
| 60-237640 | 11/1985 | Japan . |
| 62-139871 | 6/1987 | Japan . |
| 63-102018 | 5/1988 | Japan . |
| 63-217518 | 9/1988 | Japan . |

OTHER PUBLICATIONS

Mitsubishi Denki KK, Abstract of JP-90-181811, "Magnetic Recording Medium . . . ", 1990.
Fuji Photo Film KK, Abstract of JP-88-296651, "Magnetic Recording Medium . . . ", 1988.

Primary Examiner—L. Kiliman
Attorney, Agent, or Firm—Wenderoth, Lind & Ponack

[57] ABSTRACT

A magnetic recording medium comprising a non-magnetic substrate, a ferromagnetic metal film formed on said non-magnetic substrate, a carbon film which is formed on said ferromagnetic metal film and in which a concentration of at least one element selected from the group consisting of silicon, phosphorus, sulfur, tin and indium is or concentrations of boron and at least one element selected from the group consisting of tin and indium are decreased in a depth direction from the surface of said carbon film, and a lubricant layer formed on said carbon film, which medium has improved running durability and corrosion resistance.

15 Claims, 1 Drawing Sheet

Fig.

MAGNETIC RECORDING MEDIUM HAVING IMPROVED RUNNING TIME AND CORROSION RESISTANCE

BACKGROUND OF THE INVENTION

1. Field of the Invention

The present invention relates to a magnetic recording medium comprising, as a magnetic recording layer, a ferromagnetic metal thin film which is suitable for high density magnetic recording, in particular, suitable for use in a digital video tape recorder or a high definition video tape recorder.

2. Description of the Related Art

In these years, as read/write equipment is miniaturized and made high quality in the magnetic recording field, magnetic recording media which enables high density recording have been vigorously developed. Recently, a continuous thin film type magnetic recording medium which is quite advantageous in short wavelength recording has been practically used in place of a particulate magnetic recording medium comprising a magnetic layer in which magnetic powder is dispersed in a binder resin.

With each of the above type magnetic recording media, in the writing and reading processes, a magnetic recording medium and a magnetic head are contacted and slid over each other. That is, a video tape or a floppy disc is continuously contacted to and slid over the magnetic head, while a magnetic disc is discontinuously contacted to and slid over the magnetic head. However, since a magnetic layer surface of the continuous thin film type magnetic recording medium is very smooth and has low hardness so that it is easily plastically deformed, a coefficient of friction of the magnetic layer against the magnetic head tends to increase. As a result, the magnetic layer tends to be abraded or damaged in the writing and reading processes.

Further, in a high humidity atmosphere, the magnetic layer surface is oxidized and corroded, so that the magnetic characteristics of the magnetic recording medium are deteriorated.

Therefore, the conventional thin film type magnetic recording medium has a protective film and a lubricant layer on the surface the magnetic layer to increase the running durability, namely to prevent damage of the medium due to contact sliding of the medium over the magnetic head, and to improved corrosion resistance, namely to suppress corrosion of the magnetic thin layer in a high humidity atmosphere.

Currently, as a non-magnetic substrate, a polyester film or a nickel-phosphorus plated aluminum disc is used. In some cases, the non-magnetic substrate has an undercoating layer with a filler or a texture consisting of a multiplicity of circumferential stripes to control surface roughness of the medium, if desired.

The magnetic layer consisting of the ferromagnetic thin film is formed from a ferromagnetic metal or alloy such as Co—Ni, Co—O, Co—Cr, Co—Cr—Ta, Co—Ni—Cr, Co—Pt, etc. by vacuum deposition, sputtering or the like.

As the protective film, there are used amorphous carbon (cf. Japanese Patent KOKAI Publication Nos. 142525/1986 and 208622/1986), diamond-like carbon (cf. Japanese Patent KOKAI Publication Nos. 219314/1987 and 210518/1986), an oxide such as $SiO_2$ (cf. Japanese Patent KOKAI Publication No. 229743/1984), a plasma polymerized film comprising an organic compound or carbon (cf. Japanese Patent KOKAI Publication Nos. 171029/1984 and 89818/1985), and other materials disclosed in the references described below.

As the lubricant layer, a perfluoropolyether, a fluorine-containing carboxylic acid or a fluorine-containing phosphoric acid or other lubricant material is used.

Japanese Patent KOKAI Publication No. 29936/1985 (Document 1) discloses a magnetic recording medium having a diamond-like carbon film containing boron, silicon, etc. Japanese Patent KOKAI Publication No. 139871/1987 (Document 2) discloses a hydrogen-containing amorphous carbon film containing phosphorus and chromium. Japanese Patent KOKAI Publication No. 102018/1988 (Document 3) discloses a magnetic recording medium having a graphite carbon film containing 10% by weight or less of molybdenum sulfide and tungsten sulfide. Japanese Patent KOKAI Publication No. 217518/1988 (Document 4) discloses a magnetic recording medium having a graphite carbon film containing tin, indium, silicon, etc. Japanese Patent KOKAI Publication No. 237640/1985 (Document 5) discloses a magnetic recording medium having a plasma polymerized protective film comprising a hydrocarbon which contains a metal. Japanese Patent KOKOKU Publication No. 23926/1990 (Document 6) discloses a magnetic recording medium comprising a vapor phase polymerized layer comprising boron, carbon and hydrogen in which a content of boron decreases towards an interface between the polymerized layer and the ferromagnetic layer.

With the above structures, the running stability during contact sliding of the magnetic recording medium on the magnetic head and corrosion resistance in a high humidity atmosphere or a corrosive gas atmosphere may be increased, but are not necessarily increased satisfactorily.

For example, the plasma polymerized film which is formed as the protective film on the ferromagnetic metal layer as disclosed in Document 5 does not have good adhesion to the ferromagnetic metal layer. In addition, since the hardness of the plasma polymerized protective film is low, a sufficiently hard protective film is not provided. Accordingly, the magnetic recording medium is inferior in running durability.

When the various elements are added to the graphite carbon film as disclosed in Documents 3 and 4, the hardness of the protective film is insufficient. On the other hand, when the diamond-like carbon film is used as the protective film, the running durability is improved. However, since the diamond-like carbon is inactive, orientation and adhesion strength of the lubricant layer on the protective film are insufficient, so that water repellency of the magnetic recording medium is decreased. As a result, when the magnetic recording medium is kept in a high humidity atmosphere for a long time, the ferromagnetic metal layer is rusted. Further, the diamond-like carbon film and the ferromagnetic metal film are peeled off at the interface therebetween, so that output signal level is decreased. In addition, since orientation of the lubricant is insufficient, the lubricity of the magnetic recording medium is deteriorated. As a result, when the diamond-like carbon film is used as the protective film, the number of contact slides between the medium and the magnetic head increases, the coefficient of friction may increase. When the various elements are added to the hard diamond-like carbon film as disclosed in Documents 1 and 2, the hardness of the film is decreased, so that the running durability is deteriorated. Though the invention of Document 6 solves the above problems, the orientation and adhesion strength of the lubricant layer on the protective film are insufficient, and the running durability and corrosion resistance are still unstable.

SUMMARY OF THE INVENTION

An object of the present invention is to provide a magnetic recording medium having high running durability, which does not cause clogging of the magnetic head after repeated running of the medium, in particular in a video tape recorder, or decrease of running stability while it does not deteriorate the electromagnetic conversion characteristics.

Another object of the present invention is to provide a magnetic recording medium which is excellent in corrosion resistance while maintaining the electromagnetic conversion characteristics.

According to a first aspect of the present invention, there is provided a magnetic recording medium comprising a non-magnetic substrate, a ferromagnetic metal film formed on said non-magnetic substrate, a carbon film which is formed on said ferromagnetic metal film and in which a concentration of at least one element selected from the group consisting of silicon, phosphorus, sulfur, tin and indium is decreased in a depth direction from the surface of said carbon film, and a lubricant layer formed on said carbon film.

According to a second aspect of the present invention, there is provided a magnetic recording medium comprising a non-magnetic substrate, a ferromagnetic metal film formed on said non-magnetic substrate, a carbon film which is formed on said ferromagnetic film and in which concentrations of boron and at least one element selected from the group consisting of tin and indium are decreased in a depth direction from the surface of said carbon film, and a lubricant layer formed on said carbon film.

DETAILED DESCRIPTION OF THE INVENTION

In the magnetic recording medium having the above structure, a polar group of the lubricant strongly bonds with at least one element selected from the group consisting of silicon, phosphorus, sulfur, tin and indium which is present in the surface part of the carbon film, so that the adhesion strength between the carbon film and the lubricant layer is increased and also the orientation of the lubricant is improved. Consequently, the coefficient of friction between the magnetic recording medium and the magnetic head is decreased.

The above functions prevent the clogging of the magnetic head, the decrease of running stability and deterioration of the magnetic recording medium after repeated running of the medium in a video tape recorder. Further, since the lubricant layer is adhered strongly to the carbon protective film with better orientation, the recording medium has excellent water repellency. Therefore, the magnetic recording medium of the present invention can prevent penetration of moisture or corrosive gas through the protective film in a high humidity and corrosive gas atmosphere. Accordingly, rusting of the ferromagnetic metal layer or the peeling off of the ferromagnetic metal layer from the non-magnetic substrate is prevented. Thereby, the running durability and the corrosion resistance are increased. In particular, when the carbon film in which the concentration of tin or indium is decreased in the depth direction from its surface is formed and the lubricant layer is provided on the carbon film, excellent water repellency is obtained, and the corrosion resistance is greatly improved.

Since the concentration of at least one element selected from the group consisting of silicon, phosphorus, sulfur, tin and indium is decreased in a depth direction from the surface of the carbon film, the adhesion strength between the carbon film and the ferromagnetic metal film is not lowered. Simultaneously, a composition of the carbon film reaches close to that of the hard diamond-like carbon, the hardness of the carbon film is not decreased. As a result, the carbon film and the ferromagnetic metal film are less peeled off, so that the running stability is improved.

For the same reason, the running durability and the corrosion resistance are also improved, when a carbon film, in which the concentrations of boron and at least one element selected from the group consisting of tin and indium are decreased in the depth direction from the surface of carbon film, is formed on the ferromagnetic metal film and the lubricant layer is formed on the carbon film. In comparison with Document 6, corrosion resistance is greatly improved.

Figure 1:
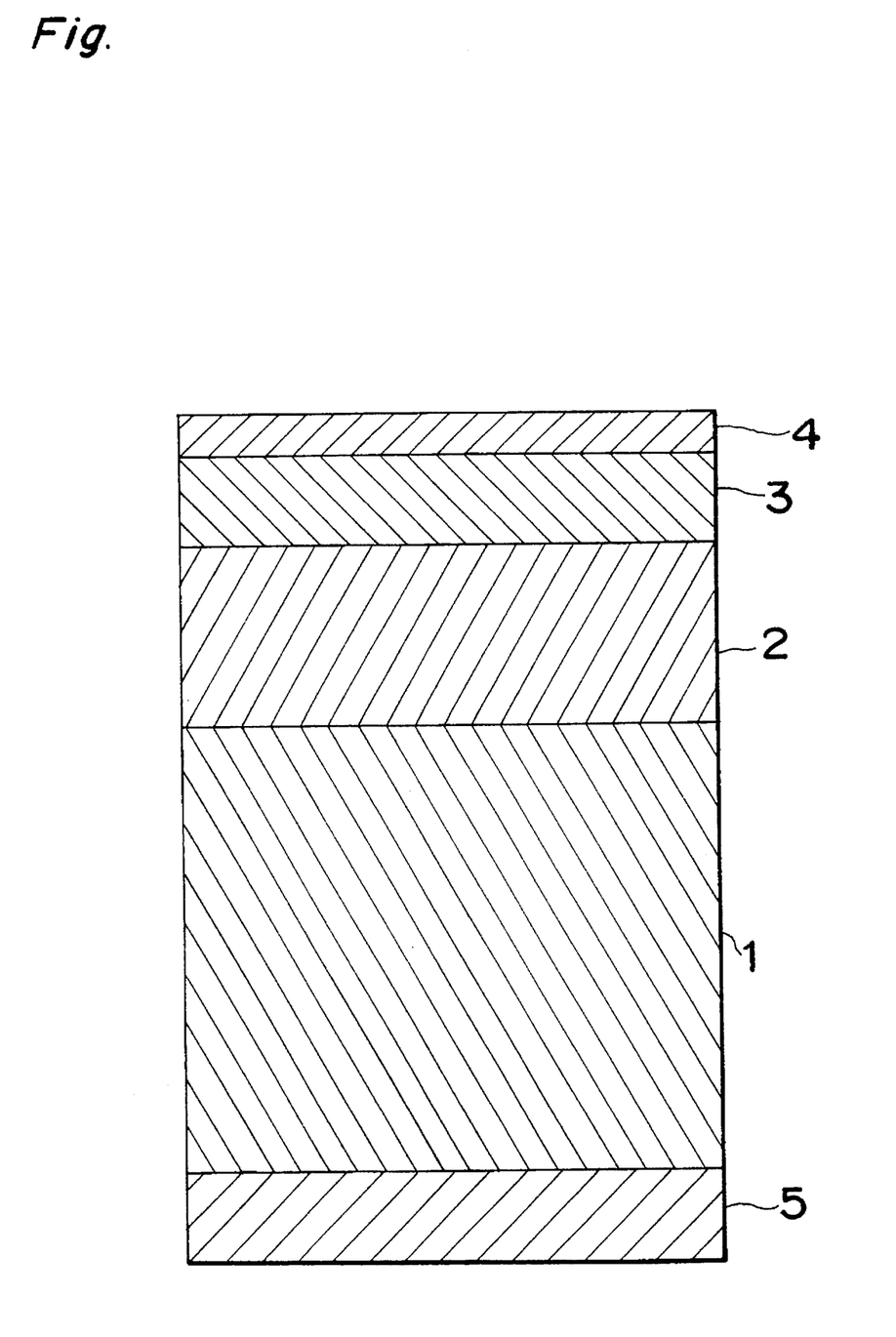
FIG. 1 shows an enlarged cross sectional view of a magnetic recording medium according to the present invention.

The present invention will be explained further in detail by referring to the accompanying drawing.

FIG. 1 is an enlarged cross sectional view of the magnetic recording medium of the present invention, which comprises a non-magnetic substrate 1, a ferromagnetic metal layer 2, a carbon film 3, a lubricant layer 4 and a back coating layer 5.

The magnetic recording medium of the present invention includes various types of media such as video tapes, audio tapes, magnetic discs, and the like.

The non-magnetic substrate may be formed of any of conventionally used materials. Examples of the non-magnetic substrate are polymer films such as a polyethylene terephthalate film, a polyethylene naphthalate film, an aromatic polyamide film and an aromatic polyimide film; an aluminum disc; and a glass disc. A surface of the non-magnetic substrate on which the magnetic layer is formed preferably has protrusions of 10 nm to 30 nm in height, since both the reliability and RF output are satisfied.

The ferromagnetic metal film 2 is made of any of the conventionally used ferromagnetic metals or alloys such as Co—Ni—O, Co—O or Co—Cr. A thickness of the ferromagnetic metal layer is from 50 nm to 300 nm in general.

The carbon film 3 has high Vickers hardness of about 2500 $kg/mm^2$ and prevents damage of the magnetic recording medium. The Vickers hardness of the film should be at least 2000 $kg/mm^2$. Its thickness is preferably from 10 nm to 20 nm in view of balance between the durable reliability and the signal output level. The carbon film may be formed by a conventional method such as plasma CVD, ion beam deposition, sputtering and the like. The carbon film contains at least one additive element selected from the group consisting of silicon, phosphorus, sulfur, tin and indium, or boron and at least one element selected from the group consisting of tin and indium. The concentration of the additive element decreases in the depth direction of the carbon film from its surface.

The concentration of the additive element in the carbon layer may change continuously or stepwise.

When a thickness of the carbon film in which the concentration of the additive element or elements is at least 1.0% based on the carbon atoms is too large, the hardness of the carbon film 3 is decreased, so that the running durability of the magnetic recording medium is greatly deteriorated and the surface of the magnetic recording medium is easily flawed. Therefore, the thickness of the carbon film in which the concentration of the additive element or elements is at least 1.0% based on the carbon atoms is not larger than 4.0 nm preferably.

The lubricant layer 4 prevents damage of the magnetic recording medium. The lubricant layer 4 is formed from any of conventional lubricant materials, preferably a lubricant having at least one polar group such as —COOH, —OH, —SH, —NH$_2$, =NH, =PR, =PRO, —SO$_3$M, —CONH$_2$, —CONHR, —CONR$_2$, —COOR, =PRS, —OPO(OH)$_2$ or —OPO(OR)$_2$ in which R is a $C_1$–$C_{22}$ hydrocarbon group, and M is a hydrogen atom, an alkali metal or an alkaline earth metal. Among the lubricants, a fluorine-containing lubricant is preferred. In particular, a fluorine-containing carboxylic acid or its ester is preferred. While an optimum thickness of the lubricant layer 4 depends on the lubricant, it is preferably from 1 nm to 5 nm. Specific examples of the lubricant are $C_5F_{11}(CH_2)_{10}COOH$, $C_5F_{11}(CH_2)_{10}COOC_8H_{17}$, $C_{12}H_{23}CH(SH)COOCH_2CH_2C_8F_{17}$, $C_5F_{11}(CH_2)_{11}NH_2$, $C_5F_{11}(CH_2)_{10}CONH_2$, $C_5F_{11}(CH_2)_{11}OH$, and the like.

The lubricant layer may be formed by any of conventional methods such as wet coating, organic vapor deposition and the like.

The ferromagnetic metal layer 2, the carbon film 3 and the lubricant layer 4 are successively formed in vacuum.

The back coating layer 5 may be formed of any of materials which are used as a back coating layer, for example, a binder resin such as polyurethane, nitrocellulose, polyester, etc. and an additive such as carbon, calcium carbonate, etc. A thickness of the back coating layer is 500 nm or less.

PREFERRED EMBODIMENTS OF THE INVENTION

Example 1

As a non-magnetic substrate 1, there was used a polyethylene terephthalate film having a width of 500 mm a surface of which had protrusions with a height of 30 nm and a diameter of 200 nm in a density of $10^5$ to $10^9$ protrusions/mm$^2$ according to the STM (Scanning Tunnel Microscope) analysis.

On the substrate 1, a ferromagnetic metal thin film 2 of Co(80)—Ni(20) having a thickness of 180 nm was formed by the oblique vapor deposition method introducing oxygen gas. Thereafter, a back coating layer 5 was formed at a thickness of 500 nm after drying by coating a coating liquid of polyurethane, nitrocellulose and carbon black (in a weight ratio of 2:2:1) in a mixed sol vent of methyl ethyl ketone, toluene and cyclohexanone (in a weight ratio of 1:2:1) (solid content of 30% by weight) with a reverse roll coater.

On the ferromagnetic metal thin film 2, a carbon sub-layer having a thickness of 15 nm and containing silicon in an atomic percentage less than 1% based on the carbon atoms was formed by the plasma CVD as follows:

This carbon sub-layer was formed by supplying a gaseous mixture of argon and hexane in a volume ratio of 1:4 under a total pressure of 0.3 Torr. while applying a direct current of 1000 V.

On this carbon sub-layer, five silicon-rich carbon sub-layers each having a thickness of 0.5 nm were formed by the plasma CVD. Each of five silicon-rich carbon sub-layers was formed by supplying a gaseous mixture of tetramethylsilane and hexane in a volume ratio of 1:5, 2:5, 3:5, 4:5 and 5:5, respectively under a total pressure of 0.1 Torr. while applying the direct current of 2000 V.

Accordingly, there was formed the carbon film 3 having a total thickness of 17.5 nm and the Vickers hardness of 2500 kg/mm$^2$, in which the silicon content decreased in the depth direction from its surface.

On the carbon film 3, the lubricant layer 4 was formed by wet coating a solution of $C_5F_{11}(CH_2)_{10}COOH$ in isopropanol of a concentration of 2000 ppm with a reverse roll coater at a thickness of 4 nm after drying.

Then, the polyethylene terephthalate film carrying the ferromagnetic metal film 2, the carbon film 3 and the lubricant layer 4 on one surface and the back coating layer 5 on the other surface was cut to a width of 8 mm to obtain a 8 mm video tape having a length of 54 m.

Example 2

In the same manner as in Example 1 except that octamethylcyclotetrasiloxane was used in place of tetramethylsilane and changing the volume ratio of the siloxane compound to hexane to 1:9, 2:8, 3:7, 4:6 and 5:5, respectively, a 8 mm video tape was produced.

Example 3

In the same manner as in Example 2 except that propargyl alcohol was used in place of hexane and changing the volume ratio of the siloxane compound to propargyl alcohol to 1:25, 2:25, 3:25, 4:25 and 5:25, respectively, a 8 mm video tape was produced.

Example 4

In the same manner as in Example 1 except that the voltage of the direct current in the formation of the silicon-rich carbon sub-layers was changed from 2000 V to 1500 V, a 8 mm video tape was produced.

Comparative Example 1

In the same manner as in Example 1 except that no silicon-rich sub-layer was formed but the carbon film 3 having the thickness of 17.5 nm was formed, a 8 mm video tape was produced.

Comparative Example 2

In the same manner as in Example 2 except that the volume ratio of octamethylcyclotetrasiloxane to hexane was changed to 1:25, 2:25, 3:25, 4:25 and 5:25, respectively, a 8 mm video tape was produced.

Comparative Example 3

In the same manner as in Example 1 except that a thickness of each silicon-rich carbon sub-layer was changed to 1.5 nm and therefore the total thickness of the silicon-rich carbon sub-layers was 7.5 nm, a 8 mm video tape was produced.

Comparative Example 4

In the same manner as in Example 1 except that a carbon film having a Vickers hardness of 1300 kg/mm$^2$ was formed in place of the carbon film having the Vickers hardness of 2500 kg/mm$^2$ a 8 mm video tape was produced.

With each of the video tapes produced in Examples 1–4 and Comparative Examples 1–4, elemental analysis was effected by X-ray photoelectron spectroscopy (using 5400 MC manufactured by Perkin-Elmer PHI), and the following properties were evaluated.

(1) Head clogging and tape damage

Using a 8 mm VTR which was modified for the measurement of RF output, image signal is recorded on the 8 mm video tape. Then, the video tape is subjected to the running durability test in which the tape runs at 40° C., 80%RH for 300 passes, 300 hours. During the running durability test, the recorded signal is always reproduced and recorded as RF output by a pen recorder (VP-6524A manufactured by Matsushita Electric Communication Industrial Co., Ltd.). The time in which the RF output is decreased by 6 dB or larger is regarded as the head clogging occurred, and the total time is measured.

The tape damage after the running durability test is observed visually, and ranked according to 5 grade criteria in which "5" means no problems in the practical use while "1" means occurrence of problems in the practical use.

(2) Change of coefficient of friction (μk change)

Before and after the running durability test, the coefficient of friction is measured as follows:

Around a cylinder of stainless steel (MH 15) having a diameter of 4 mm and surface roughness of 0.2S, the tape is wrapped at a wrapping angle of 180° contacting the magnetic layer side to the cylinder surface. While applying the tension of 10 g to one end of the tape, the other end is pulled to travel the tape around the cylinder at a rate of 14 mm/sec., and the tension (X g) generated on the other end of the tape is measured, and a coefficient of friction (μ) is calculated by the following equation:

$$\mu = (1/\pi) \times \ln(X \text{ g}/10 \text{ g})$$

(3) Observation of rust and peeling

The 8 mm tape is subjected to the corrosion resistance test by keeping it at 40° C., 90%RH for 30 days. After the corrosion resistance test, a condition of the tape surface is observed by a differential interference optical microscope, and ranked according to 5 grade criteria in which "5" means no problems in the practical use while "1" means occurrence of problems in the practical use.

(4) Change of number of drop outs (D.O. change)

Before the corrosion resistance test (3), the number of drop outs is measured using a 8 mm VTR modified for the measurement of drop outs by recording and reproducing the image signal on and from the 8 mm video tape. The number of drop outs which are larger than the width of 15 μsec. and the depth of 16 dB is counted per unit time using the drop out counter (VH 01 CZ manufactured by SHIBASOKU Co., Ltd.). After the corrosion resistance test (3), the number of drop outs is again measured.

(5) Resistance to atmospheric gas (H$_2$S and HCl)

Each 8 mm video tape is kept standing in air containing 1000 ppm of H$_2$S or HCl for 72 hours. Then the formation of rust is observed by the differential interference optical microscope and ranked according to 5 grade criteria in which "5" means no problems in the practical use while "1" means occurrence of problems in the practical use.

The results of elemental analysis and the property evaluations are shown in Tables 1 and 2, respectively.

TABLE 1

| Example No. | Total of C, Si and O contributed to C—Si and C—O bonds (atomic %) | Si/C atomic ratio near surface of carbon film (%) | Si/O atomic ratio near surface of carbon film (%) |
|---|---|---|---|
| 1 | 7.1 | 2.7 | 18.7 |
| 2 | 6.2 | 3.9 | 13.1 |
| 3 | 6.9 | 1.9 | 5.3 |
| 4 | 5.6 | <1.0 | 14.9 |
| C.1 | 2.0 | — | — |
| C.2 | 2.6 | <1.0 | 7.2 |
| C.3 | 7.7 | 3.0 | 16.5 |
| C.4 | 8.0 | 2.9 | 17.6 |

TABLE 2

| Example No. | Running durability | | | Corrosion resistance | | | |
|---|---|---|---|---|---|---|---|
| | Head clogging (sec.) | Tape damage | μk change | Rust/ peeling | D.O. change (times) | Resistance to | |
| | | | | | | H$_2$S | HCl |
| 1 | 0.5 | 5 | 0.20/0.20 | 5 | 1.1 | 5 | 5 |
| 2 | 0.0 | 5 | 0.19/0.21 | 5 | 1.1 | 5 | 5 |
| 3 | 1.5 | 4 | 0.19/0.24 | 5 | 1.3 | 5 | 5 |
| 4 | 1.0 | 4 | 0.20/0.25 | 4 | 1.6 | 4 | 4 |
| C.1 | 13.5 | 2 | 0.23/0.28 | 1 | 4.4 | 3 | 1 |
| C.2 | 17.5 | 2 | 0.20/0.26 | 2 | 3.4 | 2 | 2 |
| C.3 | 24.5 | 1 | 0.22/0.38 | 5 | 1.4 | 5 | 5 |
| C.4 | 22.0 | 1 | 0.20/0.32 | 5 | 1.8 | 4 | 4 |

As seen from the results in Tables 1 and 2, when the ferromagnetic metal film is formed on the non-magnetic substrate, the dense and hard carbon film in which the silicon concentration decreases from its surface in the depth direction is formed on the ferromagnetic metal film, and the lubricant layer is formed on the carbon film, it is possible to firmly adhere the lubricant layer with orientation to the carbon protective film on the magnetic tape without decreasing the hardness of the carbon protective film and the adhesion strength between the carbon protective film and the ferromagnetic metal film.

As a result, the magnetic recording medium is excellent in the running durability and the corrosion resistance and has good reliability.

As understood from Examples 3 and 4, when the atomic ratio of silicon to carbon, or silicon to oxygen is insufficient near the surface of the carbon film, the orientation and the adhesion strength of the lubricant layer to the carbon film tend to decrease, so that the change of the coefficient of friction in the running durability test increases and then the tape surface is damaged. Simultaneously, the water repellency tends to decrease, so that the corrosion resistance is not so good as in Examples 1 and 2. However, the video tapes of Examples 3 and 4 had still remarkably improved running durability and corrosion resistance in comparison to the video tapes of Comparative Examples 1 and 2.

Though the atomic ratios of Si, C and O are within the suitable ranges in Comparative Example 3, the thickness of the part of the carbon film containing the silicon atoms is larger than 4 nm. Therefore, the hardness of the carbon film near its surface is decreased, so that the tape damage in the running durability test is large. When the hardness of the whole carbon protective film is low as in Comparative Example 4, the tape damage is also large as in Comparative Example 3.

In the above Examples, tetramethylsilane or octamethylcyclotetrasiloxane was used to form the silicon-containing carbon film by the plasma CVD, while other silicon-containing polymerizable monomers such as hexamethyldisiloxane, trimethylchlorosilane, methyltrimethoxysilane and the like can be used as the silicon source.

Example 5

In this Example, a carbon film 3 containing phosphorus was formed in place of the carbon film containing silicon.

On the same non-magnetic substrate 1 as used in Example 1, the ferromagnetic metal film 2 and the back coating layer 5 were formed in the same manners as in Example 1.

By the same plasma CVD as in Example 1, the carbon sub-layer having the thickness of 15 nm was formed.

On this carbon sub-layer, five phosphorus-rich carbon sub-layers each having a thickness of 0.5 nm were formed by the plasma CVD. Each of five phosphorus-rich carbon sub-layers was formed by supplying a gaseous mixture of phosphine and hexane in a volume ratio of 1:10, 2:10, 3:10, 4:10 and 5:10, respectively under a total pressure of 0.1 Torr. while applying the direct current of 2000 V.

Accordingly, there was formed the carbon film 3 having a total thickness of 17.5 nm and the Vickers hardness of 2500 kg/mm$^2$ in which the phosphorus content decreased in the depth direction from its surface.

On the carbon film 3, the same lubricant layer 4 as in Example 1 was formed.

Finally, the non-magnetic substrate was cut to a width of 8 mm to obtain a 8 mm video tape having a length of 54 m.

Example 6

In the same manner as in Example 5 except that the volume ratio of phosphine to hexane was changed to 1:5, 2:5, 3:5, 4:5 and 5:5, respectively, a 8 mm video tape was produced.

Example 7

In the same manner as in Example 5 except that propargyl alcohol was used in place of hexane and the volume ratio of phosphine to propargyl alcohol was changed to 1:25, 2:25, 3:25, 4:25 and 5:25, respectively, a 8 mm video tape was produced.

Example 8

In the same manner as in Example 5 except that the voltage of the direct current in the formation of the phosphorus-rich carbon sub-layers was changed from 2000 V to 1500 V, a 8 mm video tape was produced.

Comparative Example 5

In the same manner as in Example 5 except that the volume ratio of phosphine to hexane was changed to 1:25, 2:25, 3:25, 4:25 and 5:25, respectively, a 8 mm video tape was produced.

Comparative Example 6

In the same manner as in Example 5 except that a thickness of each phosphorus-rich carbon sub-layer was changed to 1.5 nm and therefore the total thickness of the phosphorus-rich carbon sub-layers was 7.5 nm, a 8 mm video tape was produced.

Comparative Example 7

In the same manner as in Example 5 except that a carbon film having the Vickers hardness of 1300 kg/mm$^2$ was formed in place of the carbon film having the Vickers hardness of 2500 kg/mm$^2$, a 8 mm video tape was produced.

The elemental analysis and the property evaluations of the video tapes produced in Examples 5–8 and Comparative Examples 5–7 were carried out by the same ways as in Examples 1–4.

The results are shown in Tables 3 and 4.

TABLE 3

| Example No. | Total of C, P and O contributed to C—P and C—O bonds (atomic %) | P/C atomic ratio near surface of carbon film (%) | P/O atomic ratio near surface of carbon film (%) |
| --- | --- | --- | --- |
| 5 | 5.6 | 2.0 | 16.2 |
| 6 | 7.8 | 3.3 | 23.8 |
| 7 | 4.0 | 1.7 | 8.3 |
| 8 | 4.9 | <1.0 | 13.0 |
| C.1 | 2.0 | — | — |
| C.5 | 2.7 | <1.0 | 5.7 |
| C.6 | 6.4 | 2.2 | 16.5 |
| C.7 | 6.1 | 1.8 | 14.8 |

TABLE 4

| Example No. | Running durability | | | Corrosion resistance | | | |
| --- | --- | --- | --- | --- | --- | --- | --- |
| | Head clogging (sec.) | Tape damage | μk change | Rust/ peeling | D.O. change (times) | Resistance to | |
| | | | | | | H$_2$S | HCl |
| 5 | 1.0 | 5 | 0.21/0.22 | 5 | 1.3 | 5 | 5 |
| 6 | 0.0 | 5 | 0.21/0.21 | 5 | 1.2 | 5 | 5 |
| 7 | 2.0 | 4 | 0.20/0.24 | 4 | 1.7 | 4 | 4 |
| 8 | 2.5 | 4 | 0.21/0.25 | 4 | 1.9 | 4 | 4 |
| C.1 | 13.5 | 2 | 0.23/0.28 | 1 | 4.4 | 3 | 1 |
| C.5 | 17.0 | 3 | 0.24/0.29 | 2 | 3.9 | 3 | 2 |
| C.6 | 27.5 | 1 | 0.21/0.30 | 5 | 1.5 | 5 | 5 |
| C.7 | 24.0 | 1 | 0.20/0.33 | 4 | 2.2 | 4 | 4 |

As seen from the results in Tables 3 and 4, when the ferromagnetic metal film is formed on the non-magnetic substrate, the dense and hard carbon film in which the phosphorus concentration decreases from its surface in the depth direction is formed on the ferromagnetic metal film, and the lubricant layer is formed on the carbon film, it is possible to firmly adhere the lubricant layer with orientation to the carbon protective film on the magnetic tape without decreasing the hardness of the carbon protective film and the adhesion strength between the carbon protective film and the ferromagnetic metal film.

As a result, the magnetic recording medium is excellent in the running durability and the corrosion resistance and has good reliability.

The reason why the video tapes of Comparative Examples 1 and 5–7 had poor properties is the same as above.

In the above Examples, phosphine was used to form the phosphorus-containing carbon film by the plasma CVD, while other phosphorus-containing polymerizable monomers such as diethylphosphine, triethylphoshine and the like can be used as the phosphorus source.

Example 9

In this Example, a carbon film 3 containing sulfur was formed in place of the carbon film containing silicon of Example 1.

On the same non-magnetic substrate 1 as used in Example 1, the ferromagnetic metal film 2 and the back coating layer 5 were formed in the same manners as in Example 1.

By the same plasma CVD as in Example 1, the carbon sub-layer having the thickness of 15 nm was formed.

On this carbon sub-layer, five sulfur-rich carbon sub-layers each having a thickness of 0.5 nm were formed by the plasma CVD. Each of five sulfur-rich carbon sub-layers was formed by supplying a gaseous mixture of trimethylene sulfide and hexane in a volume ratio of 1:10, 2:10, 3:10, 4:10 and 5:10, respectively under a total pressure of 0.1 Torr. while applying the direct current of 2000 V.

Accordingly, there was formed the carbon film 3 having a total thickness of 17.5 nm and Vickers hardness of 2500 $kg/mm^2$ in which the sulfur content decreased in the depth direction from its surface.

On the carbon film 3, the same lubricant layer 4 as in Example 1 was formed.

Finally, the non-magnetic substrate was cut to a width of 8 mm to obtain a 8 mm video tape having a length of 54 m.

Example 10

In the same manner as in Example 9 except that the volume ratio of trimethylene sulfide to hexane was changed to 1:5, 2:5, 3:5, 4:5 and 5:5, respectively, a 8 mm video tape was produced.

Example 11

In the same manner as in Example 9 except that propargyl alcohol was used in place of hexane and the volume ratio of trimethylene sulfide to propargyl alcohol was changed to 1:25, 2:25, 3:25, 4:25 and 5:25, respectively, a 8 mm video tape was produced.

Example 12

In the same manner as in Example 9 except that the voltage of the direct current in the formation of the sulfur-rich carbon sub-layers was changed from 2000 V to 1500 V, a 8 mm video tape was produced.

Comparative Example 8

In the same manner as in Example 9 except that the volume ratio of trimethylene sulfide to hexane was changed to 1:25, 2:25, 3:25, 4:25 and 5:25, respectively, a 8 mm video tape was produced.

Comparative Example 9

In the same manner as in Example 9 except that a thickness of each sulfur-rich carbon sub-layer was changed to 1.5 nm and therefore the total thickness of the sulfur-rich carbon sub-layers was 7.5 nm, a 8 mm video tape was produced.

Comparative Example 10

In the same manner as in Example 9 except that a carbon film having a Vickers hardness of 1300 $kg/mm^2$ was formed in place of the carbon film having the Vickers hardness of 2500 $kg/mm^2$, a 8 mm video tape was produced.

The elemental analysis and the property evaluations of the video tapes produced in Examples 9–12 and Comparative Examples 8–10 were carried out by the same ways as in Examples 1–4.

The results are shown in Tables 5 and 6.

TABLE 5

| Example No. | Total of C, S and O contributed to C—S and C—O bonds (atomic %) | S/C atomic ratio near surface of carbon film (%) | S/O atomic ratio near surface of carbon film (%) |
| --- | --- | --- | --- |
| 9 | 5.4 | 1.6 | 23.1 |
| 10 | 6.8 | 2.8 | 33.0 |
| 11 | 6.1 | 1.5 | 6.2 |
| 12 | 4.2 | <1.0 | 17.6 |
| C.1 | 2.0 | — | — |
| C.8 | 2.5 | <1.0 | 8.8 |
| C.9 | 5.7 | 2.0 | 19.7 |
| C.10 | 4.9 | 2.2 | 21.7 |

TABLE 6

| Example No. | Running durability | | | Corrosion resistance | | | |
| --- | --- | --- | --- | --- | --- | --- | --- |
| | Head clogging (sec.) | Tape damage | μk change | Rust/ peeling | D.O. change (times) | Resistance to | |
| | | | | | | $H_2S$ | HCl |
| 9 | 1.0 | 5 | 0.21/0.24 | 5 | 1.3 | 5 | 5 |
| 10 | 1.0 | 5 | 0.21/0.23 | 5 | 1.3 | 5 | 5 |
| 11 | 2.5 | 4 | 0.21/0.23 | 4 | 1.6 | 5 | 5 |
| 12 | 2.5 | 4 | 0.21/0.25 | 4 | 1.7 | 4 | 4 |
| C.1 | 13.5 | 2 | 0.23/0.28 | 1 | 4.4 | 3 | 1 |
| C.8 | 18.5 | 3 | 0.22/0.28 | 2 | 3.8 | 3 | 1 |
| C.9 | 21.5 | 1 | 0.20/0.36 | 5 | 1.4 | 5 | 5 |
| C.10 | 27.0 | 1 | 0.21/0.35 | 5 | 2.0 | 4 | 4 |

As seen from the results in Tables 5 and 6, when the ferromagnetic metal film is formed on the non-magnetic substrate, the dense and hard carbon film in which the sulfur concentration decreases from its surface in the depth direction is formed on the ferromagnetic metal film, and the lubricant layer is formed on the carbon film, it is possible to firmly adhere the lubricant layer with orientation to the carbon protective film on the magnetic tape without decreasing the hardness of the carbon protective film and the adhesion strength between the carbon protective film and the ferromagnetic metal film.

As a result, the magnetic recording medium is excellent in the running durability and the corrosion resistance and has good reliability.

The reason why the video tapes of Comparative Examples 1 and 8–10 had poor properties is the same as above.

In the above Examples, trimethylene sulfide was used to form the carbon film containing sulfur by the plasma CVD, while other sulfur-containing polymerizable monomers such as ethylene sulfide, butyl mercaptan, thiophene, thiazole and the like can be used as the sulfur source.

Example 13

In this Example, a carbon film 3 containing tin was formed in place of the carbon film containing silicon of Example 1.

On the same non-magnetic substrate 1 as used in Example 1, the ferromagnetic metal film 2 and the back coating layer 5 were formed in the same manners as in Example 1.

By the same plasma CVD as in Example 1, the carbon sub-layer having the thickness of 15 nm was formed.

On this carbon sub-layer, five tin-rich carbon sub-layers each having a thickness of 0.5 nm were formed by the plasma CVD. Each of five tin-rich carbon sub-layers was formed by supplying a gaseous mixture of tetramethyltin and hexane in a volume ratio of 1:5, 2:5, 3:5, 4:5 and 5:5, respectively under a total pressure of 0.1 Torr. while applying the direct current of 1500 V.

Accordingly, there was formed the carbon film 3 having a total thickness of 17.5 nm and the Vickers hardness of 2500 kg/mm$^2$, in which the tin content decreased in the depth direction from its surface.

On the carbon film 3, the same lubricant layer 4 as in Example 1 was formed.

Finally, the non-magnetic substrate was cut to a width of 8 mm to obtain a 8 mm video tape having a length of 54 m.

Example 14

In the same manner as in Example 13 except that the total pressure of tetramethyltin and hexane was changed from 0.1 Torr. to 0.15 Torr., a 8 mm video tape was produced.

Example 15

In the same manner as in Example 13 except that propargyl alcohol was used in place of hexane, a 8 mm video tape was produced.

Example 16

In the same manner as in Example 13 except that the voltage of the direct current in the formation of the tin-rich carbon sub-layers was changed from 1500 V to 1000 V, a 8 mm video tape was produced.

Comparative Example 11

In the same manner as in Example 13 except that the volume ratio of tetramethyltin to hexane was changed to 1:20, 2:20, 3:20, 4:20 and 5:20, respectively, a 8 mm video tape was produced.

Comparative Example 12

In the same manner as in Example 13 except that a thickness of each tin-rich carbon sub-layer was changed to 1.5 nm and therefore the total thickness of the tin-rich carbon sub-layers was 7.5 nm, a 8 mm video tape was produced.

Comparative Example 13

In the same manner as in Example 13 except that a carbon film having a Vickers hardness of 1300 kg/mm$^2$ was formed in place of the carbon film having the Vickers hardness of 2500 kg/mm$^2$, a 8 mm video tape was produced.

The elemental analysis and the property evaluations of the video tapes produced in Examples 13–16 and Comparative Examples 11–13 were carried out as in Examples 1–4.

The results are shown in Tables 7 and 8.

A contact angle of water on the video tape is measured by dropping 0.1 μl of water on the surface of the tape and measuring the contact angle after 60 seconds.

TABLE 7

| Example No. | Total of C, Sn and O contributed to C—Sn and C—O bonds (atomic %) | Sn/C atomic ratio near surface of carbon film (%) | Sn/O atomic ratio near surface of carbon film (%) |
| --- | --- | --- | --- |
| 13 | 6.4 | 1.6 | 20.1 |
| 14 | 6.0 | 3.0 | 14.6 |
| 15 | 5.5 | 2.2 | 7.9 |
| 16 | 4.9 | <1.0 | 15.0 |
| C.1 | 2.0 | — | — |
| C.11 | 2.5 | <1.0 | 8.2 |
| C.12 | 6.8 | 1.7 | 21.8 |
| C.13 | 7.0 | 1.8 | 18.3 |

TABLE 8

| Example No. | Running durability | | | Contact angle (θ) (deg) | Corrosion resistance | | | |
| --- | --- | --- | --- | --- | --- | --- | --- | --- |
| | Head clogging (sec.) | Tape damage | μk change | | Rust peeling | D.O. change (times) | Resistance to | |
| | | | | | | | H$_2$S | HCl |
| 13 | 0.5 | 5 | 0.21/0.23 | 108 | 5 | 1.2 | 5 | 5 |
| 14 | 0.5 | 5 | 0.20/0.22 | 115 | 5 | 1.1 | 5 | 5 |
| 15 | 2.0 | 4 | 0.21/0.25 | 106 | 5 | 1.2 | 5 | 5 |
| 16 | 2.0 | 4 | 0.20/0.25 | 103 | 5 | 1.2 | 5 | 5 |
| C.1 | 13.5 | 2 | 0.23/ | 86 | 1 | 4.4 | 3 | 1 |

TABLE 8-continued

| | Running durability | | | Contact angle (θ) (deg) | Corrosion resistance | | | |
|---|---|---|---|---|---|---|---|---|
| | Head clogging | Tape damage | μk change | | Rust peeling | D.O. change (times) | Resistance to | |
| Example No. | (sec.) | | | | | | H₂S | HCl |
| C.11 | 14.5 | 3 | 0.28 0.23/ 0.29 | 91 | 3 | 2.8 | 3 | 3 |
| C.12 | 24.0 | 1 | 0.20/ 0.32 | 122 | 5 | 1.1 | 5 | 5 |
| C.13 | 27.5 | 1 | 0.21/ 0.35 | 110 | 5 | 1.2 | 5 | 5 |

As seen from the results in Tables 7 and 8, when the ferromagnetic metal film is formed on the non-magnetic substrate, the dense and hard carbon film in which the tin concentration decreases from its surface in the depth direction is formed on the ferromagnetic metal film, and the lubricant layer is formed on the carbon film, it is possible to firmly adhere the lubricant layer with orientation to the carbon protective film on the magnetic tape without decreasing the hardness of the carbon protective film and the adhesion strength between the carbon protective film and the ferromagnetic metal film.

As a result, the magnetic recording medium is excellent in the running durability and the corrosion resistance and has good reliability.

In comparison with the video tapes which have the carbon films containing silicon, phosphorus or sulfur, the corrosion resistance of the video tape which has the carbon film containing tin is greatly improved, since the orientation and the adhesion strength of the lubricant on the carbon film are greatly increased and the water repellency of the lubricant layer is significantly improved.

The reason why the video tapes of Comparative Examples 1 and 11–13 had poor properties is the same as above.

In the above Examples, tetramethyltin was used to form the carbon film containing tin by plasma CVD, while other tin-containing polymerizable monomers such as tin tetrachloride and the like can be used as the tin source.

Example 17

In this Example, a carbon film 3 containing indium was formed in place of the carbon film containing silicon of Example 1.

On the same non-magnetic substrate 1 as used in Example 1, the ferromagnetic metal film 2 and the back coating layer 5 were formed in the same manners as in Example 1.

By the same plasma CVD as in Example 1, the carbon sub-layer having the thickness of 15 nm was formed.

On this carbon sub-layer, five indium-rich carbon sub-layers each having a thickness of 0.5 nm were formed by the plasma CVD. Each of five indium-rich carbon sub-layers was formed by supplying a gaseous mixture of trimethylindium and hexane in a volume ratio of 1:5, 2:5, 3:5, 4:5 and 5:5, respectively under a total pressure of 0.1 Torr. while applying the direct current of 1500 V.

Accordingly, there was formed the carbon film 3 having a total thickness of 17.5 nm and the Vickers hardness of 2500 kg/mm², in which the indium content decreased in the depth direction from its surface.

On the carbon film 3, the same lubricant layer 4 as in Example 1 was formed.

Finally, the non-magnetic substrate was cut to a width of 8 mm to obtain a 8 mm video tape having a length of 54 m.

Example 18

In the same manner as in Example 17 except that the total pressure of trimethylindium and hexane was changed from 0.1 Torr. to 0.15 Torr., a 8 mm video tape was produced.

Example 19

In the same manner as in Example 17 except that propargyl alcohol was used in place of hexane, a 8 mm video tape was produced.

Example 20

In the same manner as in Example 17 except that the voltage of the direct current in the formation of the indium-rich carbon sub-layers was changed from 1500 V to 1000 V, a 8 mm video tape was produced.

Comparative Example 14

In the same manner as in Example 17 except that the volume ratio of trimethylindium to hexane was changed to 1:20, 2:20, 3:20, 4:20 and 5:20, respectively, a 8 mm video tape was produced.

Comparative Example 15

In the same manner as in Example 17 except that a thickness of each indium-rich carbon sub-layer was changed to 1.5 nm and therefore the total thickness of the indium-rich carbon sub-layers was 7.5 nm, a 8 mm video tape was produced.

Comparative Example 16

In the same manner as in Example 17 except that a carbon film having a Vickers hardness of 1300 kg/mm² was formed in place of the carbon film having the Vickers hardness of 2500 kg/mm², a 8 mm video tape was produced.

The elemental analysis and property evaluations of the video tapes produced in Examples 17–20 and Comparative Examples 14–16 were carried out as in Examples 1–4.

The results are shown in Tables 9 and 10.

TABLE 9

| Example No. | Total of C, In and O contributed to C—In and C—O bonds (atomic %) | In/C atomic ratio near surface of carbon film (%) | In/O atomic ratio near surface of carbon film (%) |
| --- | --- | --- | --- |
| 17 | 5.9 | 1.8 | 23.4 |
| 18 | 6.1 | 2.3 | 17.8 |
| 19 | 5.5 | 3.3 | 7.5 |
| 20 | 5.2 | <1.0 | 20.1 |
| C.1 | 2.0 | — | — |
| C.14 | 2.8 | <1.0 | 7.2 |
| C.15 | 6.2 | 2.0 | 21.9 |
| C.16 | 6.4 | 1.7 | 22.0 |

TABLE 10

| Example No. | Running durability | | | Contact angle (θ) (deg) | Corrosion resistance | | | |
| --- | --- | --- | --- | --- | --- | --- | --- | --- |
| | Head clogging (sec.) | Tape damage | μk change | | Rust peeling | D.O. change (times) | Resistance to | |
| | | | | | | | $H_2S$ | HCl |
| 17 | 0.5 | 5 | 0.21/0.23 | 104 | 5 | 1.1 | 5 | 5 |
| 18 | 0.5 | 5 | 0.21/0.22 | 111 | 5 | 1.1 | 5 | 5 |
| 19 | 1.5 | 4 | 0.20/0.24 | 105 | 5 | 1.2 | 5 | 5 |
| 20 | 3.0 | 4 | 0.21/0.25 | 98 | 5 | 1.3 | 5 | 5 |
| C.1 | 13.5 | 2 | 0.23/0.28 | 86 | 1 | 4.4 | 3 | 1 |
| C.14 | 16.0 | 3 | 0.22/0.28 | 89 | 3 | 3.0 | 3 | 3 |
| C.15 | 28.0 | 1 | 0.20/0.33 | 115 | 5 | 1.1 | 5 | 5 |
| C.16 | 27.0 | 1 | 0.22/0.29 | 106 | 5 | 1.3 | 5 | 5 |

As seen from the results in Tables 9 and 10, when the ferromagnetic metal film is formed on the non-magnetic substrate, the dense and hard carbon film in which the indium concentration decreases from its surface in the depth direction is formed on the ferromagnetic metal film, and the lubricant layer is formed on the carbon film, it is possible to firmly adhere the lubricant layer with orientation to the carbon protective film on the magnetic tape without decreasing the hardness of the carbon protective film and the adhesion strength between the carbon protective film and the ferromagnetic metal film.

As a result, the magnetic recording medium is excellent in the running durability and the corrosion resistance and has good reliability.

In comparison with the video tapes which have the carbon films containing silicon, phosphorus or sulfur, the corrosion resistance of the video tape which have the carbon film containing indium is greatly improved, since the orientation and the adhesion strength of the lubricant on the carbon film are greatly increased and the water repellency of the lubricant layer is significantly improved.

The reason why the video tapes of Comparative Examples 1 and 14–16 had poor properties is the same as above.

In the above Examples, trimethylindium was used to form the carbon film containing tin by the plasma CVD, while other indium-containing polymerizable monomers such as triethylindium and the like can be used as the indium source.

In the above Examples, the direct current was used in the plasma CVD. It is possible to use the direct current on which an alternating current is superposed.

In the above Examples, the carbon sub-layers containing the additive element are formed as a uniform and continuous film. However, some effect can be achieved when they may be formed as a discontinuous film.

In view of the adhesion strength between the carbon film and the lubricant layer, a total amount of the oxygen atoms and the phosphorus or sulfur atoms bonded with the oxygen atoms is preferably not larger than 1.0 atomic %.

Example 21

In this Example, a carbon film 3 containing boron and indium was formed in place of the carbon film containing silicon of Example 1.

On the same non-magnetic substrate 1 as used in Example 1, the ferromagnetic metal film 2 and the back coating layer 5 were formed in the same manners as in Example 1.

By the same plasma CVD as in Example 1, the carbon sub-layer having the thickness of 15 nm was formed.

On this carbon sub-layer, five boron/indium-rich carbon sub-layers each having a thickness of 0.5 nm were formed by the plasma CVD. Each of five boron/indium-rich carbon sub-layers was formed by supplying a gaseous mixture of $B_2H_6$, trimethylindium and hexane in a volume ratio of 1:1:10, 2:2:10, 3:3:10, 4:4:10 and 5:5:10, respectively under a total pressure of 0.1 Torr. while applying a direct current of 1500 V.

Accordingly, there was formed the carbon film 3 having a total thickness of 17.5 nm and the Vickers hardness of 2500 kg/mm², in which the boron and indium contents decreased in the depth direction from its surface.

On the carbon film 3, the same lubricant layer 4 as in Example 1 was formed.

Finally, the non-magnetic substrate was cut to a width of 8 mm to obtain a 8 mm video tape having a length of 54 m.

Example 22

In the same manner as in Example 21 except that the total pressure of $B_2H_6$, trimethylindium and hexane was changed from 0.1 Torr. to 0.15 Torr., a 8 mm video tape was produced.

Example 23

In the same manner as in Example 21 except that propargyl alcohol was used in place of hexane, a 8 mm video tape was produced.

Example 24

In the same manner as in Example 21 except that the voltage of the direct current in the formation of the boron/indium-rich carbon sub-layers was changed from 1500 V to 1000 V, a 8 mm video tape was produced.

Comparative Example 17

In the same manner as in Example 21 except that the volume ratio of $B_2H_6$, trimethylindium and hexane was changed to 1:1:40, 2:2:40, 3:3:40, 4:4:40 and 5:5:40, respectively, a 8 mm video tape was produced.

Comparative Example 18

In the same manner as in Example 21 except that a thickness of each boron/indium-rich carbon sub-layer was changed to 1.5 nm and therefore the total thickness of the boron/indium-rich carbon sub-layers was 7.5 nm, a 8 mm video tape was produced.

Comparative Example 19

In the same manner as in Example 21 except that a carbon film having a Vickers hardness of 1300 kg/mm² was formed in place of the carbon film having a Vickers hardness of 2500 kg/mm², a 8 mm video tape was produced.

The elemental analysis and the property evaluations of the video tapes produced in Examples 21–24 and Comparative Examples 17–19 were carried out as in Examples 1–4.

The results are shown in Tables 11 and 12.

TABLE 11

| Example No. | Total of C, In, B and O contributed to C—In, C—B and C—O bonds (atomic %) | (B + In)/C atomic ratio near surface of carbon film (%) | (B + In)/O atomic ratio near surface of carbon film (%) |
| --- | --- | --- | --- |
| 21 | 6.0 | 2.3 | 25.4 |
| 22 | 7.0 | 2.7 | 18.1 |
| 23 | 4.9 | 2.9 | 8.3 |
| 24 | 4.6 | <1.0 | 21.7 |
| C.1 | 2.0 | — | — |
| C.17 | 2.7 | <1.0 | 7.7 |
| C.18 | 6.2 | 1.9 | 22.6 |
| C.19 | 6.3 | 2.1 | 24.1 |

TABLE 12

| | Running durability | | | Contact angle (θ) | Corrosion resistance | | | |
| | Head clogging | Tape damage | μk change | | Rust peeling | D.O. change (times) | Resistance to | |
| Example No. | (sec.) | | | (deg) | | | $H_2S$ | HCl |
| --- | --- | --- | --- | --- | --- | --- | --- | --- |
| 21 | 0.5 | 5 | 0.21/0.23 | 100 | 5 | 1.1 | 5 | 5 |
| 22 | 0.5 | 5 | 0.21/0.23 | 108 | 5 | 1.1 | 5 | 5 |
| 23 | 1.0 | 4 | 0.21/0.25 | 104 | 5 | 1.1 | 5 | 5 |
| 24 | 2.5 | 4 | 0.21/0.24 | 99 | 5 | 1.1 | 5 | 5 |
| C.1 | 13.5 | 2 | 0.23/0.28 | 86 | 1 | 4.4 | 3 | 1 |
| C.17 | 11.0 | 3 | 0.22/0.27 | 88 | 2 | 3.5 | 3 | 2 |
| C.18 | 22.5 | 1 | 0.21/0.31 | 105 | 5 | 1.2 | 5 | 5 |
| C.19 | 19.0 | 1 | 0.21/0.32 | 102 | 5 | 1.2 | 5 | 5 |

As seen from the results in Tables 11 and 12, when the ferromagnetic metal film is formed on the non-magnetic substrate, the dense and hard carbon film in which the boron and indium concentrations decrease from its surface in the depth direction is formed on the ferromagnetic metal film, and the lubricant layer is formed on the carbon film, it is possible to firmly adhere the lubricant layer with orientation to the carbon protective film on the magnetic tape without decreasing the hardness of the carbon protective film and the adhesion strength between the carbon protective film and the ferromagnetic metal film.

As a result, the magnetic recording medium is excellent in the running durability and the corrosion resistance and has good reliability.

In comparison with the video tapes which have the carbon films containing silicon, phosphorus or sulfur, the corrosion resistance of the video tape which have the carbon film containing boron and indium is greatly improved, since the orientation and the adhesion strength of the lubricant on the carbon film are greatly increased and the water repellency of the lubricant layer is significantly improved.

The reason why the video tapes of Comparative Examples 1 and 17–19 had poor properties is the same as above.

In the above Examples, $B_2H_6$ was used to form the carbon film containing boron by the plasma CVD, while other boron-containing polymerizable monomers such as $BCl_3$, $BF_3$ and the like can be used as the boron source.

In the present invention, the content of hydrogen in the carbon film is preferably not larger than 50 atomic % in view of the hardness of the carbon film and the adhesion strength of the carbon film to the lubricant layer.

What is claimed is:

1. A magnetic recording medium comprising a non-magnetic substrate, a ferromagnetic metal film formed on said non-magnetic substrate, a carbon film which is formed on said ferromagnetic metal film comprising at least one element selected from the group consisting of silicon, phosphorus, sulfur, tin and indium in which the concentration of said element is decreased in a depth direction from the surface of said carbon film, and a lubricant layer formed on said carbon film.

2. The magnetic recording medium according to claim 1, wherein said carbon film also contains oxygen atoms and wherein a total amount of said at least one element, oxygen atoms and carbon atoms in the carbon film which form single bonds between said element and the carbon atoms and between the oxygen and the carbon atoms is at least 3.0 atomic % based on the carbon atoms.

3. The magnetic recording medium according to claim 1, wherein an atomic percentage of said at least one element near the surface of said carbon film is at least 1.0 atomic % based on the carbon atoms.

4. The magnetic recording medium according to claim 1, wherein an atomic percentage of said at least one element near the surface of said carbon film is at least 10 atomic % based on the oxygen atoms.

5. The magnetic recording medium according to claim 1, wherein an atomic percentage of said at least one element near the surface of said carbon film is at least 1.0 atomic % based on the carbon atoms, and an atomic percentage of said at least one element near the surface of said carbon film is at least 10 atomic % based on the oxygen atoms.

6. The magnetic recording medium according to claim 1, wherein a thickness of a part of the carbon film in which an atomic percentage of said at least one element is at least 1.0 atomic % based on the carbon atoms is not larger than 4.0 nm.

7. A magnetic recording medium comprising a nonmagnetic substrate, a ferromagnetic metal film formed on said non-magnetic substrate, a carbon film which is formed on said ferromagnetic film and comprising boron and at least one element selected from the group consisting of tin and indium in which the concentrations of boron and said element are decreased in a depth direction from the surface of said carbon film, and a lubricant layer formed on said carbon film.

8. The magnetic recording medium according to claim 7, wherein said carbon film also contains oxygen atoms and wherein a total amount of said at least one element, oxygen atoms, carbon atoms and boron atoms in the carbon film which form single bonds between said element and the carbon atoms, and between the boron and carbon atoms and between the carbon and oxygen atoms is at least 3.0 atomic %, based on the carbon atoms.

9. The magnetic recording medium according to claim 7, wherein a total atomic percentage of the boron atoms and said at least one element near the surface of said carbon film is at least 1.0 atomic % based on the carbon atoms.

10. The magnetic recording medium according to claim 7, wherein a total atomic percentage of the boron atoms and said at least one element near the surface of said carbon film is at least 10 atomic % based on the oxygen atoms.

11. The magnetic recording medium according to claim 7, wherein a total atomic percentage of the boron atoms and said at least one element near the surface of said carbon film is at least 1.0 atomic % based on the carbon atoms, and a total atomic percentage of the boron atoms and said at least one element near the surface of said carbon film is at least 10 atomic % based on the oxygen atoms.

12. The magnetic recording medium according to claim 7, wherein a thickness of a part of the carbon film in which a total atomic percentage of the boron atoms and said at least one element is at least 1.0 atomic % based on the carbon atoms is not larger than 4.0 nm.

13. The magnetic recording medium according to claim 1 or 7, wherein said carbon film has a Vickers hardness of at least 2000 kg/mm$^2$.

14. The magnetic recording medium according to claim 1 or 7, wherein said lubricant layer comprises a fluorine-containing lubricant having at least one polar group selected from the group consisting of —COOH, —OH, —SH, —NH$_2$, =NH, =PR, =PRO, —SO$_3$M, —CONH$_2$, —CONHR, —CONR$_2$, —COOR, =PRS, —OPO(OH)$_2$ or —OPO(OR)$_2$ in which R is a C$_1$–C$_{22}$ hydrocarbon group, and M is a hydrogen atom, an alkali metal or an alkaline earth metal.

15. The magnetic recording medium according to claim 13, wherein the thickness of the carbon film is 10 nm to 30 nm.

* * * * *